US012643961B2

(12) United States Patent
Dugonjic-Bilic et al.

(10) Patent No.: US 12,643,961 B2
(45) Date of Patent: Jun. 2, 2026

(54) MANUFACTURING METHOD FOR INVERSE EMULSION POLYMER

(71) Applicant: TouGas Holding GmbH, Frankfurt am Main (DE)

(72) Inventors: Fatima Dugonjic-Bilic, Offenbach (DE); Marita Neuber, Dreieich (DE)

(73) Assignee: TouGas Holding GmbH, Frankfurt am Main (DE)

( * ) Notice: Subject to any disclaimer, the term of this patent is extended or adjusted under 35 U.S.C. 154(b) by 980 days.

(21) Appl. No.: 17/429,149

(22) PCT Filed: Feb. 5, 2020

(86) PCT No.: PCT/EP2020/052827

§ 371 (c)(1),
(2) Date: Aug. 6, 2021

(87) PCT Pub. No.: WO2020/161171

PCT Pub. Date: Aug. 13, 2020

(65) Prior Publication Data

US 2022/0081495 A1 Mar. 17, 2022

(30) Foreign Application Priority Data

Feb. 8, 2019 (EP) .................................... 19156143

(51) Int. Cl.

| | |
|---|---|
| ***C08F 2/32*** | (2006.01) |
| ***C08F 220/56*** | (2006.01) |
| ***C08F 220/58*** | (2006.01) |
| ***C09K 8/36*** | (2006.01) |
| ***C09K 8/588*** | (2006.01) |

(52) U.S. Cl.
CPC .............. *C08F 2/32* (2013.01); *C08F 220/56* (2013.01); *C08F 220/585* (2020.02); *C09K 8/36* (2013.01); *C09K 8/588* (2013.01)

(58) Field of Classification Search
CPC ......................................................... C08F 2/32
See application file for complete search history.

(56) References Cited

U.S. PATENT DOCUMENTS

| | | | | |
|---|---|---|---|---|
| 4,951,921 | A | 8/1990 | Stahl et al. | |
| 9,434,793 | B1 | 9/2016 | Kane et al. | |
| 2013/0121943 | A1 | 5/2013 | Leyrer et al. | |
| 2015/0148269 | A1 | 5/2015 | Tamsilian et al. | |
| 2016/0362335 | A1* | 12/2016 | Dugonjic-Bilic | C04B 28/04 |

FOREIGN PATENT DOCUMENTS

| | | | | |
|---|---|---|---|---|
| GB | 2252103 A * | 7/1992 | | C08J 3/03 |
| RU | 2621711 C2 | 6/2017 | | |
| WO | WO-2014170149 A1 * | 10/2014 | | B01J 19/0093 |

* cited by examiner

*Primary Examiner* — Katarzyna I Kolb
(74) *Attorney, Agent, or Firm* — ASHLEY LAW FIRM P.C.; Stephen S. Ashley, Jr.

(57) ABSTRACT

A method to manufacture water soluble polymers in inverse (water-in-oil) emulsion with improved performance in oil recovery processes and their use in the treatment of subterranean reservoirs is disclosed.

30 Claims, No Drawings

MANUFACTURING METHOD FOR INVERSE EMULSION POLYMER

The present invention relates to a method to manufacture water soluble polymers in inverse (water-in-oil) emulsion with improved performance in oil recovery processes and their use in the treatment of subterranean reservoirs.

Water-in-oil emulsions, which are also called inverse emulsions, are useful delivery systems for water-soluble synthetic polymers such as polyacrylamides, polyacrylates or copolymers of acrylamide with other water-soluble monomers. These polymer emulsions are useful in commercial applications such as cosmetics, cleaning, wastewater treatment, papermaking and oil recovery processes.

The use of water-soluble polymers as inverse emulsions has several advantages compared to polymers in powder form:

i. The emulsion is liquid and can be pumped and easily metered ii. The inversion of the emulsion is fast and dissolution of the polymer is not time consuming and does not require equipment for maturation iii. There is no risk of dust formation during handling iv. The polymer dissolves homogeneously without risk to form gel-like particles These properties are of special advantage when water-soluble polymers are used in locations with difficult logistical connection, for example very remote areas, places with extreme weather conditions or space constraint locations. This often applies to polymers for enhanced oil recovery as polymer flooding projects take place in locations typically far away from places with well-developed infrastructure and often even on offshore platforms.

For enhanced oil recovery there are further requirements regarding the water-soluble polymer. As the polymer travels several months through the formation, it must be stable under the existing conditions and withstand thermal, biological and mechanical degradation. Furthermore, there no pressure increase should occur during injection of the polymer solution. The absence of gel-like particles that might form during dissolution of powder polymer is obviously a big advantage for good injectivity performance.

The injectivity behavior of polymers for enhanced oil recovery processes is tested in the lab by pumping the polymer solution through sand packs or core samples from the formation and measuring the pressure relative to the fluid without polymer. The permeability of the sand packs or the cores corresponds to the permeability of the formation and therefore is a good indication how the polymer solution behaves in the formation.

At constant pumping rate, the pumping pressure increases with the start of injection of polymer solution due to its higher viscosity compared to fluid without polymer, also called base fluid. Ideally, after one pore volume, the polymer solution has replaced the base fluid and the pumping pressure remains constant during further injection of polymer solution.

The differential pumping pressure of the polymer solution relative to the differential pumping pressure of the has fluid is also called resistance factor RF $$RF = \frac{\Delta p\ (polmer\ \text{solution})}{\Delta p\ (\text{base fluid})}$$

Increasing pumping pressure with time indicates that the polymer plugs the pores in the sand pack or the core. The higher the pressure increase with time, the more severe is the blocking of the porous sample. This can be expressed by calculating the resistance factor after injection of different pore volumes of polymer solution PV:

$$RF_x = \frac{\Delta p\ (\text{polymer solution after} \times PV)}{\Delta p\ (\text{base flluid})}$$

By calculating the difference between $RF_{x2}$ and $RF_{x1}$ the blocking behavior of polymer solutions can be characterized and also compared $$\Delta RF = RF_{x2} - RF_{x1}$$

with x1,x2 being pore volumes of polymer solution injected, x2>x1

Another figure for characterizing the injectivity behavior of polymer solutions is the residual resistance factor RRF.

It is defined as the differential pumping pressure of the base fluid after injection of the polymer solution relative to the differential pumping pressure of the base fluid before the polymer solution $$RRF = \frac{\Delta p\ (\text{base fluid after polymer solution})}{\Delta p\ (\text{base fluid before polymer solution})}$$

The RRF value is an indication for the reduction of permeability of the porous sand pack or core due to polymer retention. The lower the RRF value, the less is the sand pack or core affected by the polymer and the better is the injection behavior of the polymer.

Water-in-oil polymer emulsions are liquids. The aqueous phase containing the water-soluble polymer is finely dispersed in an organic oil phase not miscible with the water phase. The water droplets are stabilized by suitable surfactant or surfactant mixtures, also called emulsifier or emulsifier mixtures. Under stirring and/or in the presence of suitable inverter surfactant, the polymer is released from the micelles and forms the desired polymer solution.

Inverse Emulsion Polymerization

The inverse emulsion polymerization is a well-known technology for preparation of suitable water-in-oil polymer emulsion since the work of Vanderhoff et al. in the 1960s, see for example U.S. Pat. No. 3,284,393.

Typically; the inverse emulsion polymerization may include the following steps (i) preparation of an aqueous monomer solution, if necessary, adjusting pH value of the aforementioned monomer solution, (ii) preparation of an organic solution consisting of a water-immiscible organic liquid that does not interfere with the later radical polymerization reaction in step (iv) and (v), said organic solution containing one or more surfactants, (iii) addition of the aqueous phase of step (i) to the organic phase of step (ii) to prepare a water-in-oil emulsion, (iv) removal of oxygen and initiation of the polymerization reaction by addition of one or more compounds that form radicals, (v) adjusting reaction temperature by cooling or heating to allow complete conversion of the monomers into a polymer, (vi) optionally addition of an inverter surfactant for facilitated inversion or further additives.

Suitable emulsion polymerization techniques may have a variety of different initiation temperatures depending on, among other things, the amount and type of initiator, the feeding mode of the initiator, the amount and type of monomers, and a number of other factors known to those of ordinary skill in the art. Variations of the process of inverse emulsion polymerization often has an impact on the performance of the polymer, for example on the injectivity behavior in case of EOR polymers.

Therefore, there is a need to find conditions which allow a simple and reliable polymerization process for the synthesis of EOR polymers with improved performance in oil recovery processes.

It is well-known that oxygen traces within the reaction vessel inhibit the initiation step of radical polymerization reactions. Above specific oxygen content (the level depends on initiator class and its amount) in the reaction mixture the polymerization reaction either does not start or starts with a very low reaction rate and probably terminates with partial monomer conversion. This leads to delays and disturbed timetables in the manufacturing process. Further action is required to bring the polymerization reaction to the desired conversion level, for example via addition of further initiator or increase of reaction temperature, which may lead to deviations of polymer performance or the polymer emulsion.

Several methods are known to reduce the oxygen content. Oxygen can be removed from the reaction mixture by physical or chemical methods.

Physical methods are for example replacement of oxygen by inert gases like nitrogen or removal of oxygen with vacuum or combination thereof. Special equipment is often employed to facilitate this process, for example the use of nozzles, static or dynamic mixtures or bubble columns to ensure thorough mixing. Depending on the efficiency of mixing of the used equipment, it takes up to several hours to reduce the level of oxygen to the desired threshold.

These methods require large volumes of inert gas. The gas removes not only oxygen but also low boiling compounds from the reaction mixture. This may have an impact on the polymerization reaction and the performance of the product since the composition of the reaction mixture is changed. Furthermore, it is necessary to treat the gas flow before it is released to the atmosphere. Because of the large volume of inert gas and the equipment required for effective gas exchange and waste gas treatment, physical methods are quite expensive.

Chemical removal of oxygen happens by additions of compounds which easily react with oxygen, especially with reducing agents.

For example, EP 1 924 609 describes a process for preparing water absorbing polymers by polymerizing a monomer solution wherein the oxygen content is lower to at least 4 ppm by addition of at least one reducing agent before the polymerization, the preferred reducing agents are ascorbic acid and sodium metabisulfite.

According to EP 1 924 609 physical and chemical processes for the removal of oxygen can be combined to optimize the quantities of inert gas and reducing agents and the duration to achieve the required low oxygen level that ensure a reliable initiation of the polymerization reaction. So, the reducing agent is added only at an oxygen content of 40 ppm or lower.

In addition, it is described that the reducing agent can also act as the reducing part of a redox initiator system. In this case, the reducing agent is used in excess and serves as oxygen scavenger as well as initiator for the polymerization reaction.

A diluted solution of the reducing agent of a redox initiator system is often added slowly to the reaction mixture to control the polymerization rate and the heat of reaction and therefore to limit the reaction temperature. Typically, the addition is stopped once the polymerization has started. Thus, the concentration of initiators can be minimized. Typically, the molecular weight of polymers can be influenced by the concentration of initiators. The lower the initiator concentration is, the higher is the molecular weight due to the less number of initiated polymer chains. Therefore, it is assumed that this feeding mode leads to high molecular weight polymers which are favoured for EOR applications.

U.S. Pat. No. 4,473,689 describes a process for the preparation of high molecular weight polyacrylamide for EOR that is initiated by a redox initiator system with the second redox pair is incrementally added with a minimum effective amount being sufficient to initiate the polymerization reaction and with the addition being terminated upon start of the polymerization reaction. The start of the reaction is defined by a temperature increase of 2 to 5° C. One preferred redox system consists of ammonium persulfate and sodium metabisulfite in the presence of catalytic amounts of cuprous copper or ferrous iron.

US 2013/0121945 describes a process for the preparation of a thickener by inverse emulsion polymerization wherein the reaction temperature is kept constant by controlling the rate at which the initiator is added.

In EP 2 283 915 the preparation of an acrylamide based copolymer for EOR by inverse emulsion polymerization is described. The polymerization is initiated by addition of oxidizing agents to the reaction mixture and after purging with nitrogen the reducing agent is added slowly as diluted solution. The addition is stopped once the polymerization reaction starts and the temperature is held constant. The initiators used in this process are sodium bromate, t-butyl hydroperoxide, azobisbutyronitrile and sodium bisulfite.

Surprisingly it was found that water-soluble polymers with improved performance in oil recovery processes can be prepared by initiating the polymerization with a redox initiator system, the redox initiator system consists of at least one oxidizing agent and at least one reducing agent, whereby the oxidizing agent is first added to the reaction mixture followed by the all-at-once addition of the reducing agent that optionally also removes residual oxygen.

DETAILED DESCRIPTION

Therefore, the present invention relates to a method to prepare water-soluble polymers by inverse emulsions polymerization comprising (i) preparation of an aqueous monomer solution, if necessary, adjusting pH value of the aforementioned monomer solution, (ii) preparation of an organic solution consisting of a water-immiscible organic liquid that does not interfere with the radical polymerization reaction in step (iv) and (v), said organic solution containing one or more surfactants, (iii) addition of the aqueous phase of step (i) to the organic phase of step (ii) to prepare a water-in-oil emulsion, (iv) removal of oxygen and initiation of the polymerization reaction by addition of an initiator system, (v) adjusting the reaction temperature by cooling and/or heating to allow complete polymerization of the monomers into a polymer, (vi) optionally addition of an inverter surfactant for facilitated inversion or further additives, wherein the initiator system of step (iv) is a redox initiator system, said redox initiator system comprising/consisting of at least one oxidizing agent and at least one reducing agent, and wherein the oxidizing agent is first added to the reaction mixture followed by the all-at-once addition of the reducing agent that optionally also removes residual oxygen.

The method according to the instant invention giving rise to high molecular weight polymers, said polymers, surprisingly, having an improved injectivity behavior in the treatment of subterranean reservoirs, in particular in enhanced oil recovery processes.

A further aspect of the present invention relates to the use of water-soluble polymers obtained by the instant method for the treatment of subterranean reservoirs, in particular in enhanced oil recovery processes and relates treatment fluids, especially in treatment fluids for oil recovery processes (EOR). The polymers of the instant invention are characterized by high molecular weight and improved injectivity behavior in the treatment of subterranean reservoirs, in particular in enhanced oil recovery processes.

As mentioned, the polymers obtained by the method according to the instant invention show an improved injectivity behavior in the treatment of subterranean reservoirs, in particular in enhanced oil recovery processes. Thus, the polymers obtained by the method according to the instant invention have a good injectivity; Good injectivity as used in the instant invention refers to polymers which show as 2000 ppm (mg/I) solutions in synthetic sea water containing 55,000 ppm TDS (total dissolved solids) a difference in RF values at 100 and 20 pore volumes of less than 3, when injected into a sand pack with 350 mD at a rate of 0.33 ml/h.

Furthermore, the present invention relates to oil recovery processes and the use of the instant water-in-oil polymer emulsion in such oil recovery processes.

The present invention relates also to a method for treatment of subterranean oil and gas reservoirs, in particular for enhanced oil recovery processes, comprising the steps of:

(i) providing a water-in-oil polymer emulsion containing water-soluble polymer prepared by inverse emulsion polymerization using a redox initiator system, said redox initiator system comprising/consisting of at least one oxidizing agent and at least one reducing agent in which the oxidizing agent is first added to the reaction mixture followed by the all-at-once addition of the reducing agent that optionally also removes residual oxygen, (ii) preparing an aqueous treatment fluid by inversion of said emulsion into water that may contain salts and optionally an inverter surfactant composition, (iii) adding optionally further additives, e.g. oxygen and/or radical scavenger (iv) introducing the aqueous treatment fluid into the subterranean oil and gas reservoir formation.

Polymers and Aqueous Phase

According to the instant invention, the water-soluble polymer is a synthetic polymer, in particular such synthetic polymers are polymers, copolymers or terpolymers based on polyacrylamide and/or its derivatives.

Preferably, the synthetic polymer used in the instant invention is a synthetic polymer comprising (I) at least structural units of formula (I)

(I)

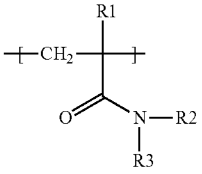

wherein

R1, R2 and R3 independently are hydrogen or $C_1$-$C_6$-alkyl, (II) from 0 to 95% by weight structural units of formula (II)

(II)

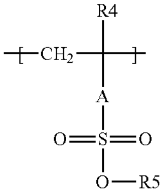

wherein

R4 is hydrogen or $C_1$-$C_6$-alkyl,

R5 is hydrogen, a cation of an alkaline metal, of an earth alkaline metal, of ammonia and/or of an organic amine, A is a covalent C—S bond or a two-valent organic bridging group, (III) from 0 to 30% by weight structural units of formula (III)

(III)

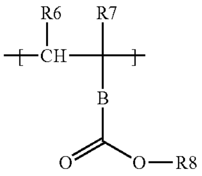

wherein

B is a covalent C—C bond or a two-valent organic bridging group

R6 and R7 are independently of one another hydrogen, $C_1$-$C_6$-alkyl, —$COOR_9$ or —$CH_2$—$COOR_9$, with $R_9$ being hydrogen, a cation of an alkaline metal, of an earth alkaline metal, of ammonia and/or of an organic amine, R8 is hydrogen, a cation of an alkaline metal, of an earth alkaline metal, of ammonia and/or of an organic amine, or is $C_1$-$C_6$-alkyl, a group —$C_nH_{2n}$—OH with n being an integer between 2 and 6, preferably 2, or is a group —$C_oH_{2o}$—NR10R11, with o being an integer between 2 and 6, preferably 2, and R10 and R11 are independently of one another hydrogen or $C_1$-$C_6$-alkyl, preferably hydrogen, (IV) from 0 to 50% by weight structural units of formula (IV)

(IV)

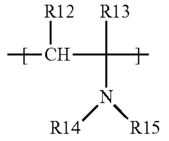

wherein

R12 and R13 are independently of one another hydrogen, $C_1$-$C_6$-alkyl, —COOR16 or —$CH_2$—COOR16, with R16 being hydrogen, a cation of an alkaline metal, of an earth alkaline metal, of ammonia and/or of an organic amine, R14 is hydrogen or, $C_1$-$C_6$-alkyl, and R15 is —COH, —CO—$C_1$-$C_6$-alkyl or R14 and R15 together with the nitrogen atom to which they are attached form a heterocyclic group with 4 to 6 ring atoms, preferably a pyridine ring, a pyrrolidone ring or a caprolactame ring, (V) from 0 to 20% by weight structural units of formula (V)

(V)

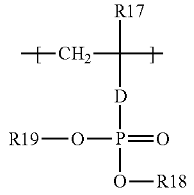

wherein

D is a covalent C—P bond or a two-valent organic bridging group

R17 is hydrogen or, $C_1$-$C_6$-alkyl, and

R18 and R19 are independently of one another hydrogen, a cation of an alkaline metal, of an earth alkaline metal, of ammonia and/or of an organic amine, B is a covalent C—P bond or a two-valent organic bridging group, (VI) optionally further copolymerisable monomers, such copolymerisable monomers being present from 0 to 20% by weight structural units, with the proviso that the percentage of the structural units of formulae (I) to (VI), preferably the structural units of formulae (I) to (V), refer to the total mass of the copolymer and the percentage of the structural units of formulae (I) to (VI), preferably the structural units of formulae (I) to (V), amounts to 100%.

The $C_1$-$C_6$-alkyl groups being present in the above formulae (I) to (V) are independently of each other and may be straight chain or branched. Examples of alkyl groups are methyl, ethyl, n-propyl, iso-propyl, n-butyl, sec.-butyl, tert.-butyl, n-pentyl or n-hexyl. Ethyl and especially methyl are preferred.

The group A may be a C—S-covalent bond or a two-valent organic group. Examples thereof are $C_1$-$C_6$-alkylene groups or —CO—$C_1$-$C_6$-alkylene groups. The alkylene groups may be straight chain or branched. Examples of A groups are —$C_pH_{2p}$— groups or —CO—NH—$C_pH_{2p}$— groups, with p being an integer between 1 and 6. —CO—NH—$C(CH_3)_2$—$CH_2$— or a C—S-covalent bond is a preferred group A.

The group B in formula (III) may be a C—C-covalent bond or a two-valent organic group. Examples thereof are $C_1$-$C_6$-alkylene groups. These groups may be straight chain or branched. Examples of alkylene groups are —$C_qH_{2q}$— groups, with q being an integer between 1 and 6. Methylene or a C—C-covalent bond is a preferred group B.

The group D in formula (V) may be a C—P-covalent bond or a two-valent organic group. Examples thereof are $C_1$-$C_6$-alkylene groups. These groups may be straight chain or branched. Examples of alkylene groups are —$C_qH_{2q}$— groups, with q being an integer between 1 and 6. Methylene or a C—P-covalent bond is a preferred group D.

The structural units of formula (I) are derived from an ethylenically unsaturated carboxylic acid amide selected from the group of acrylamide, methacrylamide and/or their N—$C_1$-$C_6$-alkyl derivatives or N,N—$C_1$-$C_6$-dialkyl derivatives.

The polymer used in the instant invention may further contain crosslinking monomers, which are monomers with more than one ethylenically unsaturated group. Different compound classes can be used, such as bis-amides, e.g. methylene-bis-acrylamide, bis-, tris- or tetraether derived from two-, three- or fourvalent alcohols and from ethylenically unsaturated halides e.g. trimethylolpropane diallylether, pentaerithriol-triallylether and tetrallyloxyethane, or esters of ethylenically unsaturated carboxylic acids with multivalent alcohol, e.g. di-, tri-, or tetraacrylates derived from ethyleneglycol, from trimethylolpropanol or from pentaerythrite, or di-, tri-, or polyamines which are substituted at the nitrogen atom with ethylenically unsaturated residues, such as N,N'-diallyl-ethylenediamine or triallylamine.

Crosslinker monomers, if present, typically are used in amounts between 0.01 and 5% by weight, preferably between 0.05 and 1% by weight, referring to the total amount of monomers used.

Preferred polymers used in the instant invention further contain structural units of formula (II) to (V) which are derived from an ethylenically unsaturated sulfonic acid and/or its alkaline metal salts and/or their ammonium salts, and/or an ethylenically unsaturated phosphonic acid and/or its alkaline metal salts and/or their ammonium salts, optionally together with further copolymerisable monomers.

Other preferred copolymers used in the instant invention are those, wherein B is a C—P covalent bond or a —$C_qH_{2q}$— group with q being an integer between 1 and 6, preferably 1, and/or wherein A is a C—S covalent bond or a —CO—NH—$C_pH_{2p}$— group with p being an integer between 1 and 6, preferably between 2 and 4, B being most preferably a group —CO—NH—$C(CH_3)_2$—$CH_2$—.

Also preferably applied are copolymers with structural units of the formula (II) derived from vinylsulfonic acid, 2-acrylamido-2-methylpropane sulfonic acid, 2-methacrylamido-2-methylpropane sulfonic acid, styrene sulfonic acid and/or their alkaline metal salts and/or their ammonium salts. Especially preferred are structural units of the formula (II) derived from vinylsulfonic acid and/or 2-acrylamido-2-methylpropane sulfonic acid and/or from their alkaline metal salts and/or from their ammonium salts.

The ethylenically unsaturated carboxylic acids of the formula (III) are preferably acrylic acid, methacrylic acid, fumaric acid, maleic acid, itaconic acid and/or crotonic acid as well as their alkaline metal salts and/or their ammonium salts. The alkylesters of ethylenically unsaturated carboxylic acids are preferably alkylesters of acrylic acid, methacrylic acid, fumaric acid, maleic acid, itaconic acid and/or crotonic acid. Especially preferred are alkylesters with 1 to 6 carbon atoms. The oxyalkylesters of an ethylenically unsaturated carboxylic acids of the formula (III) are preferably 2-hydroxyethylester of acrylic acid, methacrylic acid, fumaric acid, maleic acid, itaconic acid and/or crotonic acid.

The ester of ethylenically unsaturated carboxylic acid of the formula (III) with N-dialkylalkanolamine is preferably N,N-dimethylethanolamine methacrylate, its salt or quaternary ammonium product.

Further preferably applied copolymers with structural units of the formula (IV) are derived from N-vinylamides. The N-vinylamide is preferably N-vinylformamide, N-vinylacetamide, N-vinyl-N-methylacetamide, or N-vinylamide comprising cyclic N-vinylamide groups, preferably derived from N-vinylpyrrolidone, N-vinylcaprolactame or N-vinylpyridine.

Preferably applied are copolymers with structural units of the formula (V) are derived from vinylphosphonic acid and/or its alkaline metal salts and/or its ammonium salts, and/or allylphosphonic acid and/or its alkaline metal salts and/or its ammonium salts.

Preferred copolymers used in the instant invention are those, wherein $R_1$, $R_2$, $R_3$, $R_4$, $R_{10}$, $R_{11}$, $R_{14}$, and $R_{17}$ are independently of one another hydrogen or methyl or wherein $R_5$, $R_9$, $R_{16}$, $R_{18}$ and $R_{19}$ are independently of one another hydrogen or a cation of an alkali metal, of an earth alkaline metal, of ammonia or of an organic amine.

Still other preferred copolymers used in the instant invention are those, wherein $R_6$ and $R_{12}$ is hydrogen and $R_7$ and $R_{13}$ is hydrogen or methyl, or wherein $R_6$ is $—COOR_9$ and $R_7$ is hydrogen or wherein $R_6$ is hydrogen and $R_7$ is $-CH_2—COOR_9$ or wherein $R_{12}$ is hydrogen and $R_{13}$ is hydrogen or methyl, or wherein $R_{12}$ is $—COOR_{16}$ and $R_{13}$ is hydrogen or wherein $R_{12}$ is hydrogen and $R_{13}$ is $—CH_2—COOR_{16}$.

In particular, preferred are water-soluble synthetic copolymers material which are selected from the group consisting of polymers containing:

(I) 10 to 90% by weight of structural formula I, preferred from 20 to 70% by weight, (II) 1 to 95% by weight of structural formula II, preferred from 10 to 60% by weight, (III) 0 to 30% by weight of structural formula III, preferred from 0 to 1% by weight, more preferred 0.1 to 1% by weight, (IV) 0 to 50% by weight of structural formula IV, preferred from 0 to 20% by weight, more preferred from 0.1 to 10% by weight, (V) 0 to 20% by weight of structural formula V, preferred from 0.1 to 10% by weight, referred to the total mass of the polymer, with the proviso that the percentage of the structural units of formulae (I) to (V) refer to the total mass of the copolymer and the percentage of the structural units of formulae (I) to (V) amounts to 100%.

According to the instant invention, the water-soluble polymer is a synthetic polymer, in particular such synthetic polymers are polymers, copolymers or terpolymers based on polyacrylamide and/or its derivatives.

The synthetic polymer, in particular the synthetic copolymers and/or terpolymers according the present invention are water-soluble polymers. The term "water-soluble" as used herein means that at a concentration of at least 0.05 wt.-% the polymer is completely soluble in distilled water at 30° C. Complete dissolution as used herein means that the polymer solution visually does not exhibit particles, streaks or flocks.

Preferably, the synthetic polymer, in particular the synthetic copolymers and/or terpolymers according the present invention are not only water-soluble polymers, they further have a high molecular weight. Thus, the average molecular weight of the synthetic polymer, in particular the synthetic copolymers and/or terpolymers according the present invention is higher than 1,000,000 Dalton, preferably higher than 3,000,000 Dalton.

The average molecular weight can be determined via gel permeation chromatography (GPC). Commercially available polymers, e.g. from acrylamide with molecular weight of 1,140,000 Dalton and 5,550,000 Dalton, can be used as standards. For separation of the sample a column consisting of a polyhydroxymethacrylate copolymer network with a pore volume of 30,000 Angstrom (Å) can be used.

The intrinsic viscosity serves as indicator for the average molecular weight of the copolymers according to the invention. The specific viscosity of the polymer solution at different concentrations is determined.

The K value according to Fikentscher serves as indicator for the average molecular weight of the copolymers according to the invention. To determine the K value, the copolymer is dissolved in a certain concentration (generally 0.5 weight %, in the instant invention 0.1 wt.-%) and the efflux time at 30° C. is determined by means of an Ubbelohde capillary viscometer. This value gives the absolute viscosity of the solution ($\eta_c$). The absolute viscosity of the solvent is $\eta_o$.

The ratio of the two absolute viscosities gives the relative viscosity $\eta_{rel}$ $$\eta_{rel}=\eta_c/\eta_o$$

From the relative viscositiy, the K value can be determined as a function of the concentration c by means of the following equations:

$$\text{Log } \eta_{rel}=[(75k^2/(1+1.5kc)+k]c$$

$$k=K/1000$$

The K value of the synthetic polymer, in particular the synthetic copolymers and/or terpolymers, is higher than 300 determined as 0.1 wt.-% copolymer concentration in deionized water, preferably is higher than 350.

The copolymer content of the water-in-oil emulsion is typically from 15 to 50% by weight, preferred between 25 to 35% by weight, related to the emulsion.

The synthetic polymer, preferably the copolymer or terpolymer, is dissolved in the aqueous phase that is finely dispersed in the organic, hydrophobic phase, typically, the size of the aqueous droplet is less than 1 μm, preferred less than 500 nm, in accordance with Arshady, Colloid Polym Sci 270 (1992) 717-732 "Suspension, emulsion, and dispersion polymerization: A methodological survey". Most preferred are droplets having a size of less than 300 nm, in particular within the range from 50 to 250 nm.

Inverse Emulsion Polymerization

The inverse emulsion polymerization according to the instant invention is used to prepare water-in-oil polymer emulsion having an improved injectivity behavior in the treatment of subterranean reservoirs, in particular in enhanced oil recovery processes.

Therefore, the present invention relates to a method to prepare water-soluble polymers by inverse emulsions polymerization comprising (i) preparation of an aqueous monomer solution, if necessary, adjusting pH value of the aforementioned monomer solution, (ii) preparation of an organic solution consisting of a water-immiscible organic liquid that does not interfere with the radical polymerization reaction in step (iv) and (v), said organic solution containing one or more surfactants, (iii) addition of the aqueous phase of step (i) to the organic phase of step (ii) to prepare a water-in-oil emulsion, (iv) removal of oxygen and initiation of the polymerization reaction by addition of an initiator system, (v) adjusting reaction temperature by cooling and/or heating to allow complete polymerization of the monomers into a polymer, (vi) optionally addition of an inverter surfactant for facilitated inversion or further additives, wherein the initiator system of step (iv) is a redox initiator system, said redox initiator system consisting of at least one oxidizing agent and at least one reducing agent, and wherein the oxidizing agent is first added to the reaction mixture followed by the all-at-once addition of the reducing agent that optionally also removes residual oxygen.

As mentioned already, the method according to the instant invention gives rise to high molecular weight polymers, said polymers, surprisingly, having an improved injectivity behavior in the treatment of subterranean reservoirs, in particular in enhanced oil recovery processes.

The preparation of the aqueous monomer solution in step (i) is done by dissolving the monomers forming the later polymers in water.

Typically, the concentration of the monomers is between 25 and 70% by weight of the aqueous solution. The monomers are described by the formulae (I), (II); (Ill), (IV) and (V).

The water present in the water-in-oil polymer emulsions generally includes freshwater, but saltwater or combinations with saltwater also may be used. Generally, the water used may be from any source, provided that it does not contain an excess of compounds that may adversely affect other components in the water-in-oil polymer emulsion. Especially, easily soluble inorganic or organic salts like alkali metal and/or ammonium halides, acetates, formats and/or hydroxides may be dissolved in the water.

In some embodiments, the water may be present in the water-in-oil polymer emulsion in an amount in the range of from about 20% to about 50% by weight of the emulsion.

The aqueous phase, that means the water including the synthetic polymer, preferably the copolymer or terpolymer, typically accounts for 40 to 90 wt.-%, preferred 60 to 75 wt.-%, related to the emulsion.

The pH value of the aqueous monomer solution of step (i) may vary between 1 and 11, depending on the monomers. Typically, if necessary, it is adjusted to pH 5 and 8 by the appropriate alkali or acid, for example hydrogen chloride, acetic acid, sodium hydroxide, potassium hydroxide, sodium carbonate, ammonia, or ammonium hydroxide.

The preparation of the organic solution in step (ii) is done by mixing and dissolving one or more surfactants in an organic liquid, said organic liquid being water-immiscible. In the instant invention, water-immiscible means that the organic liquid and water when mixed together in the absence of any additives, such as emulsifiers and/or surfactants, separate into two immiscible liquid phases.

Suitable water-immiscible liquids may include, but are not limited to, water-immiscible solvents, such as paraffin hydrocarbons, naphthenic hydrocarbons, aromatic hydrocarbons, and mixtures thereof. The paraffin hydrocarbons may be saturated, linear, or branched paraffin hydrocarbons. Examples of suitable aromatic hydrocarbons include, but are not limited to, toluene and xylene. The water-immiscible liquid may be present in the water in oil polymer emulsion in an amount sufficient to form a stable emulsion. In some embodiments, the water-immiscible liquid may be present in the water in oil polymer emulsions in an amount in the range from about 10% to about 50% by weight.

The organic liquid has to be suitable for the later radical polymerization reaction. Suitable means that the organic liquid is chemically inert in the course of the radical polymerization reaction and don't affect the polymerization process.

The organic solution of step (ii) contains at least one surfactant capable of stabilizing water-in-oil-emulsions. The term "stabilizing" means that the surfactant prevents the emulsion from aggregation and flocculation.

To stabilize aqueous droplets in inverse emulsions, typically oil-soluble surfactants are used according to Bancroft's rule which states that the fluid with higher solubility for the surfactant forms the continuous phase. Lipophilic surfactants suitable for inverse emulsions are non-ionic and characterized by a HLB value between 3 and 8, see Römpp Chemielexikon $9^{th}$ ed., 1990.

HLB value means the hydrophilic-lipophilic balance of a surfactant and is a measure of the degree to which it is hydrophilic or lipophilic, determined by calculating values for the different regions of the molecule. The most common method was developed by W. C. Griffin in 1949 and results in a ranking of the surfactants between 0 and 20 with 0 corresponds to a completely lipophilic/hydrophobic molecule, and a value of 20 corresponds to a completely hydrophilic/lipophobic molecule. The HLB values of the surfactants specified by the suppliers according to that method were used in the present invitation.

Suitable surfactants or mixtures of surfactants according to this invention exhibit a HLB value of less than 10, preferred less than 8. In order to obtain this HLB value it is possible to use mixtures of different surfactants having different HLB values.

When the HLB values of the individual surfactants are different from each other, the overall HLB value of the mixture corresponds to the weighted average of the single compounds.

Suitable surfactants according to this invention may include, but are not limited to fatty acids, fatty acid esters, alcohols, ethers, alkoxylated alcohols, alkylated polyols, alkoxylated polyols, polyol esters, alkoxylated polyol esters, alkylates amine, alkoylated amines, alkylated amides, alkoxylates amides, alkyl polyglycosides, alkoxylated polyglycosides, alkylated sulphur-containing compounds, alkoxylated sulphur-containing compounds, alkylated phosphorous-containing compounds, alkoxylated phosphorous-containing compounds.

Preferred surfactants are sorbitan fatty acid esters and alkoxylated sorbitan fatty acid esters and mixtures hereof and sorbitan fatty acid esters and alkyl polyglycosides. The surfactant or the mixture of surfactants should be present in an amount sufficient to provide the desired stable water in oil polymer emulsion. In some embodiments; the surfactant or the mixture of surfactants may be present in an amount in the range of from about 0.5% to about 6% by weight of the emulsion.

To prepare a water-in-oil emulsion in step (iii), the aqueous phase of step (i) is added to the organic phase of step (ii) under appropriate mixing. It is preferred to use special homogenizer equipment like rotor/stator mixer or high pressure homogenizer until the desired dispersion of the water phase in the organic phase is achieved. The addition of the aqueous solution to the organic phase is typically done at ambient temperature. In some cases, cooling might be appropriate to remove the heat caused by the energy input from the mixing.

Typically, the mass ration of the aqueous phase to the organic phase varies between 9:1 and 1:1, preferred between 3:1 and 1.5:1.

The removal of oxygen in step (iv) is done by applying vacuum and/or stripping with inert gas. Typically, the residual oxygen content after this step is less than 100 ppm, preferred less than 10 ppm.

The initiation of the radical polymerization reaction in step (iv) is done by the addition of an initiator system. According to the instant invention, the initiator system is a redox initiator system, said redox initiator system consisting of at least one oxidizing agent and at least one reducing agent. Preferably, the redox initiator system consists of at least two oxidizing agent and at least one reducing agent. According to the instant invention, the oxidizing agent is first added to the reaction mixture followed by the all-at-once addition of the reducing agent, said reducing agent optionally also removes residual oxygen present in the solution.

Reducing agent according to the present invention include ammonium or alkali metal salts of hydrogen sulfite, sulfite, thiosulfate, hyposulfite, metabisulfite, pyrosulfite, sodium hydroxymethyl sulfoxylate, sulfide, reducing saccharides like glucose or galactose, ascorbic acid and salts thereof, tocopherol and esters thereof. Preferred reducing agents are sodium hyposulfite, sodium metabisulfite, and ascorbic acid.

Suitable oxidizing agents according to the present invention that are used in connection with the reducing agent are for example organic peroxides, hydro peroxides, hydrogen peroxide, persulfates and bromates. They can be used alone or applied as mixtures of different oxidizing agents from one of the chemical groups mentioned but also from different chemical groups.

Organic peroxides are selected from the group of percarbonates, peroxy dicarbonates, diacyl peroxides, dialkyl peroxides, and/or ester of peracids. They can be used alone or in combination with one or more other oxidizing agents. Preferred organic percarbonates are t-amyl-2-ethyl hexyl percarbonate, t-butyl-2-ethyl hexyl percarbonate.

Preferred organic peroxy dicarbonates are diisopropyl peroxydi carbonate, di sec-butyl peroxydicarbonat, di t-butyl peroxydicarbonate, di n-butyl peroxydicarbonate, di (2-ethylhexyl) peroxyperdicarbonate, di (4-t-butyl)cyclohexyl peroxydicarbonate, dicetyl peroxydicarbonate Preferred diacyl peroxide are diisobutyryl peroxide, dilauroyl peroxide, didecanoyl peroxide, dibenzoyl peroxide.

Preferred dialkyl peroxides are di t-butylperoxide, dicumylperoxide, cumyl-t-butyl peroxide, 2,5-di methyl-2,5-di(t-butylperoxy)hexane, 1,1-di(t-butylperoxy)cyclohexane, 1,1-di(t-amylperoxy)cyclohexane, 1,1-di(t-butylperoxy)3,3,5-trimethylcyclohexane.

Preferred esters or peracids are esters from peracetic acid, perpivalic acid, perbutanoic acid, perdecanoic acid, perneodecanoic acid, perheptanoic acid, per(2-ethylhexanoic) acid, perbenzoic acid with t-butanol, t-amyl alcohol, 2-ethyl hexanol, 1,1,3,3-tetramethyl butanol, cumol.

Preferred hydroperoxides are cumyl hydoperoxide, i-propylcumyl hydroperoxide, t-butyl hydroperoxide, t-amyl hydroperoxide, 1,1,3,3-tetramethyl hydroperoxide.

Preferred persulfates are ammonium, sodium and potassium persulfates. Most preferred oxidizing agents are ammonium persulfate, sodium persulfate, t-butyl hydroperoxide, benzoylperoxide, and dicumylperoxide.

Preferred combinations of reducing and oxidizing agents are sodium metabisulfite/sodium persulfate, sodium metabisulfite/t-butyl hydroperoxide and ascorbic acid/sodium persulfate.

A redox initiator system can be used alone or in combination with other initiators like for example azo initiators like azobisbutyronitrile or after applying physical methods to reduce dissolved oxygen.

It is preferred to add the oxidizing agent first to the reaction mixture followed by the reducing agent. Optionally, the oxidizing agent may already be added completely or partially to the monomer mixture in step i).

The quantities of oxidizing and reducing agent that are necessary to initiate the polymerization reaction depend on reaction and process conditions like desired initiation temperature, chemical composition and thermal stability of the initiators, especially of the organic peroxides, and residual dissolved oxygen. The quantity of oxidizing agent is $1*10^{-5}$ to 2 wt.-%, preferred $1*10^{-4}$ to 0.5 wt.-%, and most preferred $1*10^{-3}$ to 0.1 wt.-%. The quantity of reducing agent is $1*10^{-3}$ to 2 wt.-%, preferred $1*10^{-2}$ to 0.5 wt.-%, and most preferred 0.01 to 0.1 wt.-%, related to the mass of the monomers.

The term "all-at-once" means that the reducing agent is added to the emulsion of step (iii) as fast as possible and that no measures are taken to slow down the addition rate of the reducing agent such as reduced pumping rate or narrowed diameter of feeding line. Therefore, the addition time of the reducing agent is typically less than 30 seconds, preferred less than 10 seconds.

Typically, the temperature is adjusted to the desired starting temperature of the polymerization directly prior to the addition of the initiators. The temperature at which the initiators are added, therefore may vary in a broad range between 0° C. and 80° C., preferred between 10° C. and 40° C. It is recommended to ensure a good distribution of the initiators by means of stirring or appropriate mixing.

In step (v), the reaction temperature of the radical polymerization reaction is typically kept in range from 20° C. and 90° C. by cooling and/or heating to allow for complete conversion of monomers into the polymer. Complete in this context means, that the residual monomer content in the reaction mixture is below 1 wt.-% related to the weight of polymer emulsion.

In step (vi) an inverter surfactant for facilitated inversion or further additives can be added optionally. Among other things, the inverter may facilitate the inverting of the emulsion upon addition to the aqueous treatment fluids of the present invention. Upon addition to the aqueous treatment fluid, the emulsion should invert, releasing the copolymer into the aqueous treatment fluid. Examples of suitable inverters include, but are not limited to, alkoxylated alcohols, nonionic surfactant with an HLB of from 12 to 14, and mixtures thereof. The inverter should be present in an amount sufficient to provide the desired inversion of the emulsion upon contact with the water in the aqueous treatment fluid. In some embodiments, the inverter may be present in an amount in the range of from about 0.5 wt.-% to about 10 wt.-% by weight of the emulsion.

Among other things, a salt may be present, to add stability to the emulsion and/or reduce the viscosity of the emulsion. Examples of suitable salts, include, but are not limited to, ammonium chloride, potassium chloride, sodium chloride, ammonium sulfate; and mixtures thereof. In some embodiments; the salt may be present in the water-in-oil polymer emulsions in an amount in the range of from about 0.5 wt.-% to about 2.5 wt.-% of the emulsion.

Further details on radical polymerization reaction and emulsion polymerization techniques can be found in e.g. Ullmann Encyclopedia of Technical Chemistry, $5^{th}$ edition, vol A21, p. 305.

Treatment Fluid

A treatment fluid for treatment of subterranean oil and gas reservoirs, in particular for enhanced oil recovery processes, is prepared by inverting the water-in-oil polymer emulsion using water or an aqueous solution under appropriate shearing. Inversion means that the synthetic polymer, in particular the synthetic copolymers and/or terpolymers, is released from the micelles to an aqueous treatment fluid. Preparing such aqueous synthetic polymer, in particular the synthetic copolymers and/or terpolymers, solution may comprise providing the inverse polymer emulsion and the water or aqueous solution, combining the inverse polymer emulsion with the water or aqueous solution to from the aqueous treatment fluid.

The water for preparing the treatment fluid according to this invention can be fresh water, e.g. river water, or natural occurring brines like sea water, formation water, produced water and/or flow back from a well after a stimulation process and mixtures thereof containing different concentrations of salts. In addition, further salts can be added to achieve improved performance of the treatment fluid. Therefore, the water for preparing the polymer solution and the treatment fluid may contain salts comprising mono-, di-, or trivalent cations and or anions, non-limiting examples are lithium, sodium, potassium, strontium, ammonium, calcium, magnesium, barium, boron, aluminum, iron, fluoride, chloride, bromide, sulfate, carbonate, acetate, formate. TDS (total dissolved solids) may range from 50 ppm TDS e.g. for fresh water to 330,000 ppm TDS for high saline brines.

The aqueous solution may further contain water miscible solvent as alcohols, e.g. methanol, ethanol, n- and i-propanol, glycol.

The aqueous polymer solution may further contain additives that are necessary for the treatment. Those additives may include buffer, surfactants, biocides, radical scavengers, and/or oxygen scavengers.

The presence of an inverting surfactant may facilitate the hydration. Inverting surfactants can be added to the water or directly to the polymer emulsion.

The inverter surfactant may also be added to the water before addition of the polymer emulsion. Examples of suitable inverters include, but are not limited to, alkoxylated alcohols, nonionic surfactant with an HLB of from 12 to 14, and mixtures thereof. The inverter should be present in an amount sufficient to provide the desired inversion of the emulsion upon contact with the water in the aqueous treatment fluid. In some embodiments, the inhibitor may be present in an amount in the range of from about 0.01% to about 2% by weight of the treatment fluid.

The concentration of the copolymer in the aqueous treatment fluid is typically from 0.001 to 10% by weight, preferred from 0.005 to 5% by weight and most preferred from 0.01 to 2% by weight, referred to the aqueous polymer solution.

The viscosity of the polymer containing treatment fluid ranges from about 0.5 to 100 mPas depending on the conditions of the well treatment, preferred from about 1 to 10 mPas.

Method

The aqueous treatment fluids of the present invention can be used in any subterranean treatment where a fluid with increased viscosity is desired. The preferred use is for enhanced oil recovery processes.

Furthermore, the present invention relates to the use of such water-soluble polymers in oil recovery processes.

The present invention relates also to a method for treatment of subterranean oil and gas reservoirs, in particular for enhanced oil recovery processes, comprising the steps of:

(i) providing a water-in-oil polymer emulsion containing the water-soluble polymer prepared by the use of a redox initiator system, whereby the oxidizing agent is first added to the reaction mixture followed by the all-at-once addition of the reducing agent that optionally also removes residual oxygen, (ii) preparing an aqueous treatment fluid by inversion of said emulsion into water that may contain salts and optionally a inverter surfactant composition, (iii) adding optionally further additives, e.g. oxygen and/or radical scavenger (iv) introducing the aqueous treatment fluid into the subterranean oil and gas reservoir formation.

The aqueous treatment fluid may be introduced into the portion of the subterranean formation at a rate and pressure suitable for sweeping residual oil out of the treated portion of the formation.

Test Methods

The following testing methods are used:

The average molecular weight can be determined via gel permeation chromatography (GPC). Commercially available polymers, e.g. from acrylamide with molecular weight of 1,140,000 Dalton and 5,550,000 Dalton, can be used as standards. For separation of the sample a column consisting of a polyhydroxymethacrylate copolymer network with a pore volume of 30,000 Angstrom (Å) can be used.

The K value (K) according to Fikentscher serves as indicator for the average molecular weight of the copolymers according to the invention. To determine the K value, the copolymer was dissolved in a certain concentration (generally 0.5 wt.-%, in the instant invention 0.1 wt.-%) and the efflux time at 30° C. was determined by means of an Ubbelohde capillary viscometer. This value gives the absolute viscosity of the solution ($\eta_c$). The absolute viscosity of the solvent is $\eta_o$. The ratio of the two absolute viscosities gives the relative viscosity $\eta_{rel}$ $$\eta_{rel}=\eta_c/\eta_o$$

From the relative viscosity, the K value can be determined as a function of the concentration c by means of the following equations:

$$\text{Log } \eta_{rel}=[(75k^2/(1+1.5kc)+k]c$$

$$k=K/1000$$

The viscosity of polymer solutions was determined using an Ubbelohde capillary viscometer.

For the Ubbelohde capillary viscometer the capillary of appropriate width was chosen, about 30 ml of the sample were filled into the capillary. The capillary was then allowed to adjust temperature to 30° C. for 10 min in a water bath. The time of the defined sample volume for passing through the capillary was taken and then multiplied with the capillary constant to give the viscosity in mPa*s.

Injectivity tests were done using quartz sand packs at ambient temperature. The column for the sand pack was made from plexiglass, the length of the fill was about 4 cm, the volume about 22 ml. Synthetic sea water or polymer solution was pumped with a rate of 0.33 ml/h. The ambient pressure as well as the pressure before the sand pack were recorded by a data logger system.

HLB values of the surfactants were provided by the supplier. The term "HLB value" denotes the hydrophilic-lipophilic balance of a substance and thus gives information on the lipophilic or hydrophilic tendency of a substance. The higher the HLB value, the better the hydrophilicity. The HLB value can be determined by calculating the values for the different regions of the molecule, as described by Griffin in 1949 (Griffin, William C. (1949), "Classification of Surface-Active Agents by 'HLB", Journal of the Society of Cosmetic Chemists, 1 (5): 311-26) and 1954 (Griffin, William C. (1954), "Calculation of HLB Values of Non-Ionic Surfactants", Journal of the Society of Cosmetic Chemists, 5 (4): 249-56), and as described by Davies in 1957 (Davies JT (1957), "A quantitative kinetic theory of emulsion type, I. Physical chemistry of the emulsifying agent", Gas/Liquid and Liquid/Liquid Interface, Proceedings of the International Congress of Surface Activity, pp. 426-38). The HLB value of a mixture of substances can be determined by multiplying the HLB value of the single substance with their weight shares in the mixture and summing up the obtained values.

As a preferred reference, the HLB value can be determined by using the Griffin's method for non-ionic surfactants as described in the paper of 1954 (Griffin, William C. (1954), "Calculation of HLB Values of Non-Ionic Surfactants", Journal of the Society of Cosmetic Chemists, 5 (4): 249-56):

$$HLB=20\times M_h/M$$

where $M_h$ is the molecular mass of the hydrophilic portion of the molecule, and M is the molecular mass of the whole molecule, giving a result on a scale of 0 to 20. An HLB value of 0 corresponds to a completely lipophilic/hydrophobic molecule, and a value of 20 corresponds to a completely hydrophilic/lipophobic molecule.

Abbreviations ppm parts per million in mg/l
ppb parts per billion in µg/l
$\eta_o$ Viscosity of solvent solution for K value determination
$\eta_c$ Viscosity of copolymer solution for K value determination
$\eta_{rel}$ Relation of $\eta_c$ relative to $\eta_o$
c Concentration of polymer in solution, determination of K value
wt.-% % by weight
TDS Total dissolved solids
Δp Differential pressure
PV Pore volume
RF Resistance Factor $$RF=\frac{\Delta p\ (polmer\ \text{solution})}{\Delta p\ (\text{base fluid})}$$

RRF Residual Resistance Factor $$RRF=\frac{\Delta p\ (\text{base fluid after polymer solution})}{\Delta p\ (\text{base fluid before polymer solution})}$$

ΔRF Differential Resistance Factor $$\Delta RF=RF_{x2}-RF_{x1}$$

$X_{1,2}$ Number of pore volumes polymer solution pumped

EXAMPLES

Example 1

20 g sorbitan sesquioleate were dissolved in 172 g $C_{11}$-$C_{16}$ isoparaffin. 100 g distilled water 36 g of aqueous ammonia solution (25%) were placed in a beaker were cooled to 5° C., then 110 g 2-acrylamido-2-methylpropane sulfonic acid were added. The pH was adjusted to 7.1 with aqueous ammonia solution. Subsequently 146.7 g acryl amide solution (50 wt.-% in water) were added.

Under vigorous stirring the aqueous monomer solution was added to the isoparaffinic mixture. The emulsion was then purged for 45 min with nitrogen. The oxygen content was determined using a dissolved oxygen meter (Oxi 197-S, WTW). The oxygen content was less than 100 ppb.

The polymerization was started by addition of 0.05 g sodium persulfate in 12 g distilled water followed by the all-at-once addition of 0.01 g sodium metabisulfite in 10 g distilled water.

The start of the polymerization is indicated by an increase of temperature. The temperature is allowed to raise and further increased to 80° C. and maintained at this temperature for 2 h by means of an oil bath. The polymer emulsion was cooled to ambient temperature. As product, a polymer emulsion was obtained.

The K value of the 0.1 wt.-% polymer solution (in deionized water containing 0.5 wt.-% of an ethoxylated 013 alcohol having a HLB value of >10) was determined to be 467.

Example 2

A polymer emulsion was prepared according to example 1, however the same quantity of sodium metabisulfite solution was added over a period of 30 minutes. The K value was determined to be 482.

Example 3

A polymer emulsion was prepared according to example 1 adding the 0.05 g of t-butyl hydroperoxide in 10 g water instead of sodium persulfate solution. The K value was determined to be 461.

Example 4

A polymer emulsion was prepared according to example 3, however the same quantity of sodium metabisulfite solution was added over a period of 30 minutes. The K value was determined to be 496.

Example 5

A polymer emulsion was prepared according to example 3, however the sodium metabisulfite solution was prepared with 0.1 g sodium metabisulfite in 10 g distilled water, as the oxygen content was 1 ppm.

The K value was determined to be 551.

It is obvious from the K values that both feeding modes result in polymers with high molecular weight. It is also demonstrated, that a higher residual oxygen content can be removed by a higher concentration of reducing agent.

Examples 6 to 9

Polymer solutions were prepared by inverting the polymer emulsions of examples 1 to 4 in synthetic sea water with 55,000 ppm TDS. 1000 ppm inverting surfactant having a HLB value of about 13 were added to the sea water, then, under stirring, polymer emulsion was added to achieve an active polymer concentration of 2000 ppm.

The polymer solutions were stirred for 60 min and then injected into a sand pack characterized by a permeability of about 350 mD. The resistance factors were determined after injection of 20 and 100 pore volumes of polymer solution. The sand pack was purged using the synthetic sea water before and after injection of the polymer solution

| | Polymer solution prepared from | $RF_{20}$ | $RF_{100}$ | ΔRF | RRF |
|---|---|---|---|---|---|
| Ex. 5 | Ex. 1 | 4.5 | 7.1 | 2.6 | 4 |
| Ex. 6 | Ex. 2 | 7.5 | 23.4 | 15.9 | >20 |
| Ex. 7 | Ex. 3 | 4.4 | 5.4 | 1.0 | 2 |
| Ex. 8 | Ex. 4 | 9.7 | 61.8 | 52.1 | >90 |

The injectivity tests show good injectivity of the polymers that were prepared by adding the reducing agent all-at-once. In contrast, the polymers that were synthesized by slow addition of the reducing agent blocked the sandpack.

We claim:

1. A method to prepare a water-soluble polymer by batch inverse emulsion polymerization comprising:

(i) preparing an aqueous monomer solution, and if necessary, adjusting pH value of the aqueous monomer solution, (ii) preparing an organic solution consisting of a water-immiscible organic liquid that does not interfere with the radical polymerization reaction in step (iv) and (v), said organic solution containing one or more surfactants, (iii) adding the aqueous phase of step (i) to the organic phase of step (ii) to prepare a water-in-oil emulsion, (iv) removing oxygen and initiating the polymerization reaction by addition of an initiator system, (v) adjusting the reaction temperature by external cooling and/or external heating to allow complete polymerization of the monomers into a polymer, (vi) optionally adding an inverter surfactant for facilitated inversion or further additives, and wherein the initiator system of step (iv) is a redox initiator system, said redox initiator system consisting of at least one oxidizing agent and at least one reducing agent, and wherein the oxidizing agent is first added to the reaction mixture followed by all-at-once addition of the reducing agent that optionally also removes residual oxygen; and wherein the water-soluble polymer comprises a synthetic polymer consisting essentially of:

(I) 10 to 90% by weight of structural formula (I)

(I)

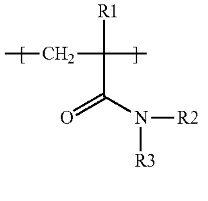

wherein

R1, R2 and R3 independently are hydrogen or $C_1$-$C_6$-alkyl, (II) 1 to 95% by weight structural units of formula (II)

(II)

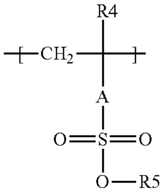

wherein

R4 is hydrogen or $C_1$-$C_6$-alkyl,

R5 is hydrogen, a cation of an alkaline metal, of an earth alkaline metal, of ammonia and/or of an organic amine, A is a covalent C—S bond or a two-valent organic bridging group, (III) from 0 to 30% by weight structural units of formula (III)

(III)

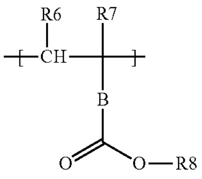

wherein

B is a covalent C—C bond or a two-valent organic bridging group

R6 and R7 are independently of one another hydrogen, $C_1$-$C_6$-alkyl, —$COOR_9$ or —$CH_2$—$COOR_9$, with $R_9$ being hydrogen, a cation of an alkaline metal, of an earth alkaline metal, of ammonia and/or of an organic amine, R8 is hydrogen, a cation of an alkaline metal, of an earth alkaline metal, of ammonia and/or of an organic amine, or is $C_1$-$C_6$-alkyl, a group —$C_nH_{2n}$—OH with n being an integer between 2 and 6, or is a group —$C_oH_{2o}$—NR10R11, with o being an integer between 2 and 6, and R10 and R11 are independently of one another hydrogen or $C_1$-$C_6$-alkyl, (IV) from 0 to 50% by weight structural units of formula (IV)

(IV)

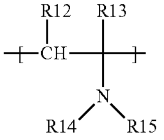

wherein

R12 and R13 are independently of one another hydrogen, $C_1$-$C_6$-alkyl, —COOR16 or —$CH_2$—COOR16, with R16 being hydrogen, a cation of an alkaline metal, of an earth alkaline metal, of ammonia and/or of an organic amine, R14 is hydrogen or, $C_1$-$C_6$-alkyl, and R15 is —COH, —CO—$C_1$-$C_6$-alkyl or R14 and R15 together with the nitrogen atom to which they are attached form a heterocyclic group with 4 to 6 ring atoms, (V) from 0 to 20% by weight structural units of formula (V)

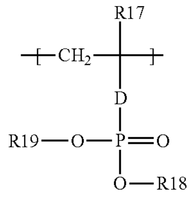

(V)

wherein

D is a covalent C—P bond or a two-valent organic bridging group

R17 is hydrogen or, $C_1$-$C_6$-alkyl, and

R18 and R19 are independently of one another hydrogen, a cation of an alkaline metal, of an earth alkaline metal, of ammonia and/or of an organic amine, B is a covalent C—P bond or a two-valent organic bridging group;

wherein the percentage of the structural units of formulae (I) to (V) refer to the total mass of the copolymer and the percentage of the structural units of formulae (I) to (V) amounts to 100%.

2. The method of claim 1, wherein the preparation of the aqueous monomer solution in step (i) is done by dissolving the monomers forming the latex polymers in water.

3. The method of claim 1, wherein the preparation of the organic solution in step (ii) is done by mixing an organic liquid with said one or more surfactants, said organic liquid being water-immiscible.

4. The method of claim 1, wherein the one or more surfactants added to the organic liquid in step (ii) exhibit a HLB of less than 10.

5. The method of claim 1, wherein the concentration of the one or more surfactants added to the organic liquid in step (ii) is in the range from about 0.5% to about 6% by weight of the emulsion.

6. The method of claim 1, wherein oxygen in step (iv) is removed to a level of less than 100 ppm.

7. The method of claim 1, wherein the at least one reducing agent in the redox initiator system is ammonium or alkali metal salts of hydrogen sulfite, sulfite, thiosulfate, hyposulfite, metabisulfite, pyrosulfite, sodium hydroxymethyl sulfoxylate, sulfide, reducing saccharides like glucose or galactose, ascorbic acid and salts thereof, tocopherol and esters thereof.

8. The method of claim 1, wherein the reducing agent is added to the emulsion of step (iii) such that the addition time of the at least one reducing agent is less than 30 seconds.

9. The method of claim 1, wherein the oxidizing agents in the redox initiator system comprise organic peroxide, hydro peroxide, hydrogen peroxide, persulfate and bromate.

10. The method as claimed in claim 9, wherein the organic peroxide is selected from the group of percarbonates, peroxy dicarbonates, diacyl peroxides, dialkyl peroxides, and/or ester of peracids.

11. The method of claim 1, wherein the quantities of the at least one oxidizing agent is 1*10-5 to 2 wt.-%, related to the mass of the monomers.

12. The method of claim 1, wherein the quantities of the at least one reducing agent is 1*10-3 to 2 wt.-%, related to the mass of the monomers.

13. A water-soluble polymer obtainable by an inverse emulsions polymerization method of claim 1, said polymer exhibiting a differential RF value of less than 3 when injected as 2000 ppm (mg/l) solution in synthetic sea water containing 55,000 ppm TDS (total dissolved solids) into a sand pack with 350 mD at a rate of 0.33 ml/h, the RF values determined at 100 and 20 pore volumes.

14. A method for treatment of subterranean oil and gas reservoirs, in particular for enhanced oil recovery processes, comprising the steps of:

(i) providing a water-in-oil polymer emulsion containing the water-soluble polymer prepared by the method of claim 1, (ii) preparing an aqueous treatment fluid by inversion of said emulsion into water that may contain salts and optionally a inverter surfactant composition, (iii) adding optionally further additives, e.g. oxygen and/or radical scavenger, and (iv) introducing the aqueous treatment fluid into the subterranean oil and gas reservoir formation.

15. An aqueous treatment fluid for treatment of subterranean oil and gas reservoirs, in particular in enhanced oil recovery, said treatment fluid being obtained by inversion of a water-in-oil polymer emulsion, wherein the water-in-oil polymer emulsion containing water-soluble polymer in the aqueous phase, the water-soluble polymer prepared by the method of claim 1.

16. Use of a water-in-oil polymer emulsion containing water-soluble polymer in the aqueous phase, the water-soluble polymer prepared by the method of claim 1 for preparing an aqueous treatment fluid by inversion of said emulsion into water, said aqueous treatment fluid being a fluid for treatment of subterranean oil and gas reservoirs, in particular in enhanced oil recovery.

17. The method of claim 1, wherein R10 and R11 are hydrogen.

18. The method of claim 1, containing 0.1 to 1% by weight of structural formula III.

19. The method of claim 1, containing from 0.1 to 10% by weight of structural formula IV.

20. The method of claim 1, containing from 0.1 to 10% by weight of structural formula V.

21. The method of claim 2, wherein the concentration of the monomers is between 25 and 70% by weight of the aqueous monomer solution.

22. The method of claim 3, wherein the water-immiscible liquid is present in the water-in-oil emulsion in an amount in the range from about 10% to about 50% by weight.

23. The method of claim 4, wherein the one or more surfactants added to the organic liquid in step (ii) exhibit a HLB of less than 8.

24. The method of claim 6, wherein oxygen in step (iv) is removed to a level of less than 10 ppm.

25. The method of claim 7, wherein the at least one reducing agent is sodium hyposulfite, sodium metabisulfite, and ascorbic acid.

26. The method of claim 8, wherein the addition time of the at least one reducing agent is less than 10 seconds.

27. The method of claim 11, wherein the quantities of the at least one oxidizing agent is 1*10-4 to 0.5 wt.-% relative to the mass of the monomers.

28. The method of claim 11, wherein the quantities of the at least one oxidizing agent is 1*10-3 to 0.1 wt.-% relative to the mass of the monomers.

29. The method of claim 12, wherein the quantities of the at least one reducing agent is 1*10-2 to 0.5 wt.-%, relative to the mass of the monomers.

30. The method of claim 12, wherein the quantities of the at least one reducing agent is 0.01 to 0.1 wt.-%, relative to the mass of the monomers.

* * * * *